Patented Oct. 2, 1928.

1,686,075

UNITED STATES PATENT OFFICE.

EMIL EDWIN, OF TRONDHJEM, NORWAY, ASSIGNOR TO THE FIRM: AKTIESELSKAPET NORSK STAAL (ELEKTRISK-GAS-REDUKTION), OF OSLO, NORWAY.

PROCESS OF MAKING SYNTHETIC PIG IRON.

No Drawing. Application filed January 25, 1927, Serial No. 163,550, and in Norway December 10, 1925.

So-called synthetic pig iron was hitherto produced from wrought iron scrap by carbonization under addition of silicium, manganese and like elements characteristic for pig iron. This process has the advantage that the content of the product of said foreign elements may be regulated at will, so that a product of almost exactly the composition which is desired for the various uses may be obtained.

It turns out however that it is not possible by this process to arrive at a high quality product such as for instance the Swedish charcoal pig iron, with its excellent and hitherto unsurpassed properties for, for instance steel making. Experience has shown that even if it succeeds to make a synthetic product of practically the same chemical composition as the Swedish pig iron, which it is desired to imitate nevertheless the properties of the synthetic product with respect to refining possibilites are by far inferior to those of the Swedish iron,—quite a strange statement, which it has not been possible to give a full explanation for.

According to the present invention it is possible to make a synthetic pig iron, which in regard to qualities for refining is entirely equal to the Swedish charcoal iron. The ore is first by means of a reduction process at relatively low temperature, preferably by gas reduction within a temperature range of for instance 900–1200° C., transformed into spongy iron. This latter is subsequently by suitable dressing, for instance by magnetic separation freed from gangue. The resulting almost entirely pure spongy iron, is given an addition of carbonaceous material of high purity such as for instance charcoal, petroleum coke or the like in such quantities as required for the desired degree of carbonization, and the charge is smelted in an electric furnace under acid conditions and at as low a temperature as possible that is to say between 1100° and 1300° C. The acid smelting proves to be of great importance to the quality of the resulting product. Suitable quantities of silicon, manganese and like elements according to the sort of pig iron desired may be added to the molten bath before or during the carbonization.

I claim:

1. Process of producing synthetic pig iron from pure sponge iron, which is obtained by reducing iron ore by means of reducing gases and magnetically separating iron and gangue, comprising mixing finely divided pure sponge iron intimately with finely divided substantially pure carbonaceous material without addition of other ferrous material and subjecting the mixture to melting in an electric furnace under acid conditions and at as low a temperature as possible.

2. Process of producing synthetic pig iron from pure sponge iron, which is obtained by reducing iron ore by means of reducing gases and magnetically separating iron and gangue, comprising mixing finely divided pure sponge iron intimately with finely divided substantially pure carbonaceous material without addition of other ferrous material, subjecting the mixture to melting in an electric furnace under acid conditions, and at a temperature of 1100°–1300° C., and adding to the fused bath required quantities of finishing substances as silicon, manganese and like elements, in order to obtain the desired grade of pig iron.

In testimony that I claim the foregoing as my invention I have signed my name.

EMIL EDWIN.